United States Patent [19]
Porter

[11] Patent Number: 4,953,662
[45] Date of Patent: Sep. 4, 1990

[54] CLIMBING APPARATUS

[76] Inventor: William M. Porter, 404 White Store Rd., Wadesboro, N.C. 28170

[21] Appl. No.: 297,123

[22] Filed: Jan. 17, 1989

[51] Int. Cl.$^5$ ............................ A45F 3/26; A47C 9/10
[52] U.S. Cl. .................................... 182/135; 182/187; 108/152
[58] Field of Search ............... 182/187, 188, 135, 134; 108/152

[56] References Cited

U.S. PATENT DOCUMENTS

| | | |
|---|---|---|
| 3,338,332 | 1/1966 | Brantley . |
| 3,419,108 | 10/1966 | Mobbs . |
| 3,485,320 | 12/1969 | Jones . |
| 3,730,294 | 5/1973 | Thurmond . |
| 3,955,645 | 5/1976 | Dye . |
| 3,960,240 | 6/1976 | Cotton . |
| 4,022,292 | 5/1977 | Van Gompel . |
| 4,120,379 | 10/1978 | Carter . |
| 4,134,474 | 1/1979 | Stavenau . |
| 4,137,995 | 2/1979 | Fonte . |
| 4,230,203 | 10/1980 | Sweat et al. . |
| 4,236,602 | 12/1980 | Leggett . |
| 4,316,526 | 2/1982 | Amacker . |
| 4,321,983 | 3/1982 | Nelson . |
| 4,331,216 | 5/1982 | Amacker . |
| 4,369,858 | 1/1983 | Babb . |
| 4,417,645 | 11/1983 | Untz . |
| 4,452,338 | 6/1984 | Untz . |
| 4,582,165 | 4/1986 | Latini .................................... 182/187 |
| 4,726,447 | 2/1988 | Gibson .................................. 182/187 |
| 4,890,694 | 1/1990 | Williams ............................... 182/187. |

Primary Examiner—Reinaldo P. Machado
Attorney, Agent, or Firm—A. Milton Cornwell, Jr.

[57] ABSTRACT

An apparatus for climbing a tree or like vertical columnar member comprising an upper climbing member including a main frame having a tree engagement gripper support attached to the terminal ends of the main frame, lower gripper means attached to said gripper support and positioned to provide gripping pressure against a tree, a shaped rail attached to said main frame opposite the terminal ends thereof, and comprising an elevated safety-bar portion in the form of a convoluted loop with two open ends, a tree engagement portion in telescopic sliding adjustment engagement with the open ends of the shaped rail for selectively affixing the shaped rail to a tree, upper gripper means attached to the tree engagement portion and positioned to provide gripping pressure against the tree, a plurality of vertical rear bracing means positioned near the terminal ends of the main frame and joining the main frame to the shaped rail, a main frame platform covering the area between the center and the non-terminal ends portion of the main frame, a plurality of opposed vertical center bracing means joining said main frame and shaped rail, a pair of pivotable tubular holders mounted on opposed vertical center bracing means, a detachable seat telescopically inserted into the tubular holders and a foot climber member.

10 Claims, 3 Drawing Sheets

CLIMBING APPARATUS

BACKGROUND OF THE INVENTION

2. FIELD OF THE INVENTION

Hunters and observers of game animals have long realized the importance of gaining elevation from ground level to get above the animals line of sight, to avoid detection by the animals keen sense of smell, and to increase the hunter or obervers visibility of the area.

Portable tree climbing stands, seats, and platforms that allow one to obtain elevation have been the subject of many previous patents which depict a variety of construction techniques and art forms. Compromise between physical weight, size, strength, user comfort, portability, method of attachment to the tree, ease of operation, mode of use; standing, sitting, or a combination of both, facing tree or facing away from the tree, or probably the most important, user safety, are but some of the major variables of the art.

This invention is an improvement in user safety and comfort for tree climbing apparatus or device.

2. DESCRIPTION OF PRIOR ART

Tree climbing devices have been the subject of many patents including the following:

U.S. Pat. No. 3,485,320 to Jones, Dec., 1969
U.S. Pat. No. 3,960,240 to Cotton, June, 1, 1976
U.S. Pat. No. 4,137,995 to Fonte, Feb. 6, 1979
U.S. Pat. No. 4,230,203 to Sweat, Oct. 28, 1980
U.S. Pat. No. 4,316,526 to Amacker, Feb. 23, 1982
U.S. Pat. No. 4,321,983 to Nelson, Mar. 30, 1982
U.S. Pat. No. 4,331,216 to Amacker, May 25, 1982
U.S. Pat. No. 4,417,645 to Untz, Nov. 29, 1983
U.S. Pat. No. 4,452,338 to Untz, June 5, 1984

These patents feature two separate members operating independent of each other, with the user's feet operating the lower device usually called a foot climber, and the user's arms operating the upper unit or stand.

Some devices require the user to sit facing the tree while others allow the user to sit with back against the tree, and a few permit the user a combination of both. U.S. Pat. No. 3,960,240 to Cotton allows the user to climb and descend a tree while facing away from the tree, but this places the user in an awkward and unsafe position while raising and lowering the members. Furthermore, the user of any climbing device should be able to see the tree or structure being climbed since some trees are prone to have decayed or rotten cavities which could result in a serious accident if not detected in due time. U.S. Pat. No. 4,230,203 to Sweat attempts to solve the problem of climbing a tree while facing it. Sweat requires repositioning the body on the upper climbing member in order to have the user's back against the tree with user facing away from the tree. This increases the visibility and mobility while standing on the lower member's platform and using upper member as a seat. This also allows the use of archery equipment which requires more forward room away from the tree. Again user safety is sacrificed since one must step out of the upper climbing member and back onto the lower member platform one leg at a time. The user could disengage the upper member's grippers while making the 180 degree turn on the platform resulting in loosing balance and one's safety would depend on an auxiliary safety strap or harness not the subject of this patent. Another disadvantage of this type of climbing apparatus requires the user to straddle the means that makes contact with tree or other columnar like structure on the upper climbing device where user's sensitive lower anatomy can easily make contact with the means. A serious accident is very possible if the lower climbing member slips and allows user to fall downward making contact with said member between user's legs. U.S. Pat. No. 4,316,526 to Amacker on Feb. 23, 1982 offers a stable two piece climbing apparatus but user is facing the tree which restricts the user's field of view and furthermore archery equipment is very difficult to use with this stand. It should be noted that no back support is provided and user must straddle as in Sweat for the user. The steel spike grippers have been known to dig into soft wood trees so deep that it was very difficult to disengage the grippers with user's feet.

Amacker 4,331,216 solved the problem of user restriction as to facing the tree when the desired height was reached by making a much larger lower climbing member and also a large upper climbing member which has a sliding detachable seat permitting the user to sit against tree, using the tree as a back rest. However, the user is positioned inside the rectangular frame which provides some safety but restricts a person using archery equipment. One can use archery equipment, but it's very easy to strike the front and side member with said equipment creating a noise that alerts game animals. When using the detachable sliding seat in the forward position away from the tree, there is no back rest provided to support user's back which is uncomfortable. It should be further noted that when the seat on the upper member is against the tree with user facing away from the tree, the upper member's forward frame is used as a foot support or rest. The user's legs have to be extended extremely high in an uncomfortable and awkward position, especially if the proper distance for sitting is maintained between the upper and lower member. Again the two steel spike grippers have been known to dig very deep into soft wood bark trees requiring a very difficult task for the user to remove them by upward pressure provided by the feet and legs. U.S. Pat. No. 4,321,983 to Nelson discloses a climbing apparatus consisting of an upper climbing device that supports user's body with user's feet extending downward through an opening allowing user's feet to operate a lower climbing device that supports user's feet. Once user has reached the desired elevation the upper climbing device can be used to sit on with a back rest member provided. User can also stand on the seat or platform and can position a cloth seat attached between the two side frame members to sit upon and rest user's back against the tree. This stand offers the user a lot of versatility but has no forward safety means to keep user from stepping off the platform when standing upright. Side to side stabilization is impaired since the platform member is attached to the two side frame members by bolts, flanges and nuts. And the forward wedge support member is not permanently attached between the two side frame members allowing the side frame members to flex. It should be noted that the wedge used to secure the climbing stand to the tree has a limited contact area against said tree, and the upper engaging bar member that contacts opposite side of said tree has no external grippers provided on said engaging bar member to securely engage said tree. The lower device or foot climber has no platform available to secure user's feet to said device and requires good balance and skill on user's part to operate the said device. The physical weight of this stand is also heavy since larger diameter tubing has to be used due to the extreme forces created between the forward wedge and engaging bar member due to lever type action as a result of the closeness of the forward wedge and engaging bar member.

In Untz U.S. Pat. No. 4,417,645 the user faces the tree while climbing and when the desired height is reached the user can continue to sit on the platform with feet resting on lower members platform or can stand on lower member's platform and turn around facing away from said tree. However, when using archery equipment, the fixed back rest support offers a forward obstruction to archery equipment and due to lower members, small size, user stability and mobility is impaired. Another disadvantage of the lower climbing member is the bar that is welded for support between the arms and used as the means to place feet under the said bar to lift the climbing member to disengage and engage the said climbing member. Only limited control is provided for the climbing member and requires extra effort and skill to use on tree having a scaley, loose bark, and again the space for the user's feet is very limited.

Untz in U.S. Pat. No. 4,452,338 solved the problem of using the upper climbing member to sit on or stand on with the addition of a dual purpose seat that could be used as a back rest while sitting on the platform. Seat could also swing or pivot upward against the tree to be used a a seat. Archer equipment could now be used without any forward or side restriction, especially when standing on the upper climbing member platform. However, in order to order to raise the seat upward and against the tree, the user must step onto the platform and while raising the seat upward, one must step over and around the seat one foot and leg at a time. Even with an auxiliary safety strap or harness attached from user to said tree, the danger exists to loose balance while pivoting the seat upward to rest against said tree. Another disadvantage of the above patent is when user is standing on the upper member platform, which has a limited usable forward platform size when its seat back is in place against the tree, there is no forward means to prevent the user from falling off the platform.

The following U.S. Patents depict telescoping components used on tree climbing devices that allow the said devices to be able to adjust to varying tree diameters, and to level the said devices using a variety of anchoring methods:

U.S. Pat. No. 4,022,292 to Van Gompel on May 10, 1977
U.S. Pat. No. 4,316,526 to Amacker on Feb. 23, 1982
U.S. Pat. No. 4,321,983 to Nelson on Mar. 30, 1982
U.S. Pat. No. 4,331,216 to Amacker on May 25, 1982
U.S. Pat. No. 4,417,645 to Untz on Nov. 29, 1983
U.S. Pat. No. 4,452,338 to Untz on June 5, 1984

The following U.S. Patents further show a variety of one piece and/or disconnect loops with different auxiliary grippers attached to encircle and engage a tree or columnar like structure to level the tree climbing device, and to further provide adjustability for varying diameter trees and to keep said climbing device in a stable position.

U.S. Pat. No. 3,338,332 to Brantly on Aug. 29, 1967
U.S. Pat. No. 3,955,645 to Dye on May 11, 1976
U.S. Pat. No. 4,022,292 to Van Gompel on May 10, 1977
U.S. Pat. No. 4,321,983 to Nelson on Mar. 30, 1982
U.S. Pat. No. 4,417,645 to Untz on Nov. 29, 1982
U.S. Pat. No. 4,452,338 to Untz on June 5, 1984

The following U.S. Patents depict stands with seats attached and/or fold-down seats attached:

U.S. Pat. No. 3,338,332 to Brantley on Jan. 21, 1966
U.S. Pat. No. 3,419,108 to Mobbs on Oct. 10, 1966
U.S. Pat. No. 3,485,320 to Jones on Dec. 23, 1969
U.S. Pat. No. 3,730,294 to Thurmond on May 1, 1973

U.S. Pat. No. 4,120,379 to Carter on Oct. 17, 1978
U.S. Pat. No. 4,134,474 to Stavenah on Jan. 16, 1979

U.S. Pat. No. 4,236,602 to Leggett on Dec. 2, 1980
U.S. Pat. No. 4,321,983 to Nelson on Mar. 30, 1982
U.S. Pat. No. 4,369,858 to Babb on Jan. 25, 1983
U.S. Pat. No. 4,452,338 to Untz on June 5, 1984

SUMMARY OF THE INVENTION

This invention provides a tree climbing apparatus which has improved safety and comfort consisting of two separate units working in conjunction with each other to encircle and engage a tree or columnar like structure between two separate sets of steel grippers on each device whereby the user can safely climb said tree and once the desired elevation is obtained can comfortably sit on the upper member (stand) while facing toward or away from said tree and with a fixed safety rail in place.

The invention provides an improved safety feature in moving from a position facing the tree to one facing away from the tree. This invention permits the user, while sitting on upper stand platform, to remove a spacious durable seat from pivotable means that are attached to upright side gussets by removing two clip pins or like devices. User can safely make the transition from sitting on the stand platform to sitting on the seat platform. Said seat is stored behind the fixed safety rail and when removed can be repositioned against the tree to either sit upon, or continue to sit on stand platform and use the seat as a rifle support, camera and equipment shelf, or arm rest.

It is a further feature of the invention to improve safety and comfort by providing a novel one piece continuous length of tubular steel, shaped to provide the multiple functions of a back rest, foot rest and safety rail. It is attached to stand's frame which houses a half hexagon shaped tubular tree engagement portion with two welded steel grippers to encircle and engage a tree to adjust to varying tree diameters and provide a stable means of holding said stand in position. The one piece continous length of tubular steel is designed to provide a fixed back rest which can be padded for user comfort, which also serves as a foot rest when using the seat to sit on while user's back is resting against tree, and most importantly, a forward safety rail or guard when standing on stands platform to use archery equipment or firearms requiring one to stand in certain situtations. The safety rail or guard restricts the user's forward movement without placing a serious limitation when using extra long equipment such as in archery.

It is an additional feature of the invention to provide a foot climbing apparatus that will safely support the user's feet and body weight and allow the user the necessary control of the said device to climb and descent trees and columnar like structures and have the ability to grip said tree or structures, and further have adjustability to fit varying diameter trees within its size capacity. This is accomplished by providing a rectangular shaped resilient tie down strap which allows the user's feet to be placed under the strap giving the user the means to control the foot climber in an efficient manner.

It is a further aspect of the invention to provide a half hexagon shaped (three 60° angles or bends) tubular steel gripper means with two welded steel grippers that will adequately grip trees and columnar like structures yet not dig into the tree bark or surface to the extent where damage to said tree is present. The grippers with 45° beveled edges are to spaced apart on said gripper to add stability to prevent accidental slippage, and provide side to side stability for the climbing stand or foot climber. The steel grippers provide film contact with said tree yet are able to be easily disengaged because of the 45° beveled edges without any undue effort on user's part.

It is a further feature of the invention to provide a rope, cord or strap that is attached from the upper stand to the lower foot climber and designed to limit the stroke length of user's legs when operating both devices. By limiting the stroke length the user maintains the proper distance between the foot stand and the seat.

It is a still further feature of the invention to permit the use of archery equipment when standing on upper stands platform without any undue restriction, yet by the use of a novel safety rail or guard to offer a safety feature to restrict the user's forward motion and define the forward limit of the stands platform.

DETAILED DESCRIPTION OF PREFERRED EMBODIMENTS

Figure 1:
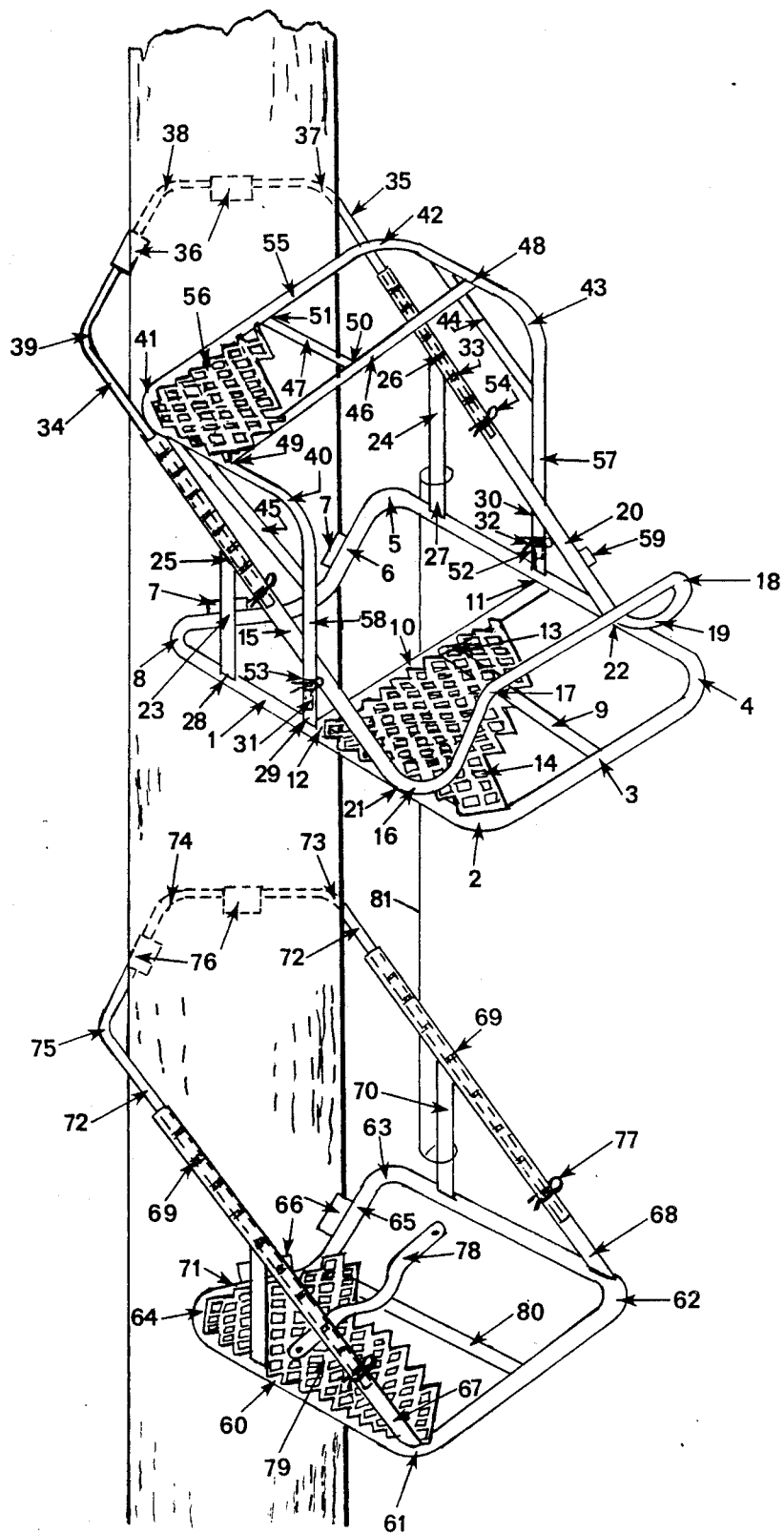
FIG. 1 is an isometric view of a preferred embodiment of the climbing device of the present invention in an operating condition.
Figure 2:
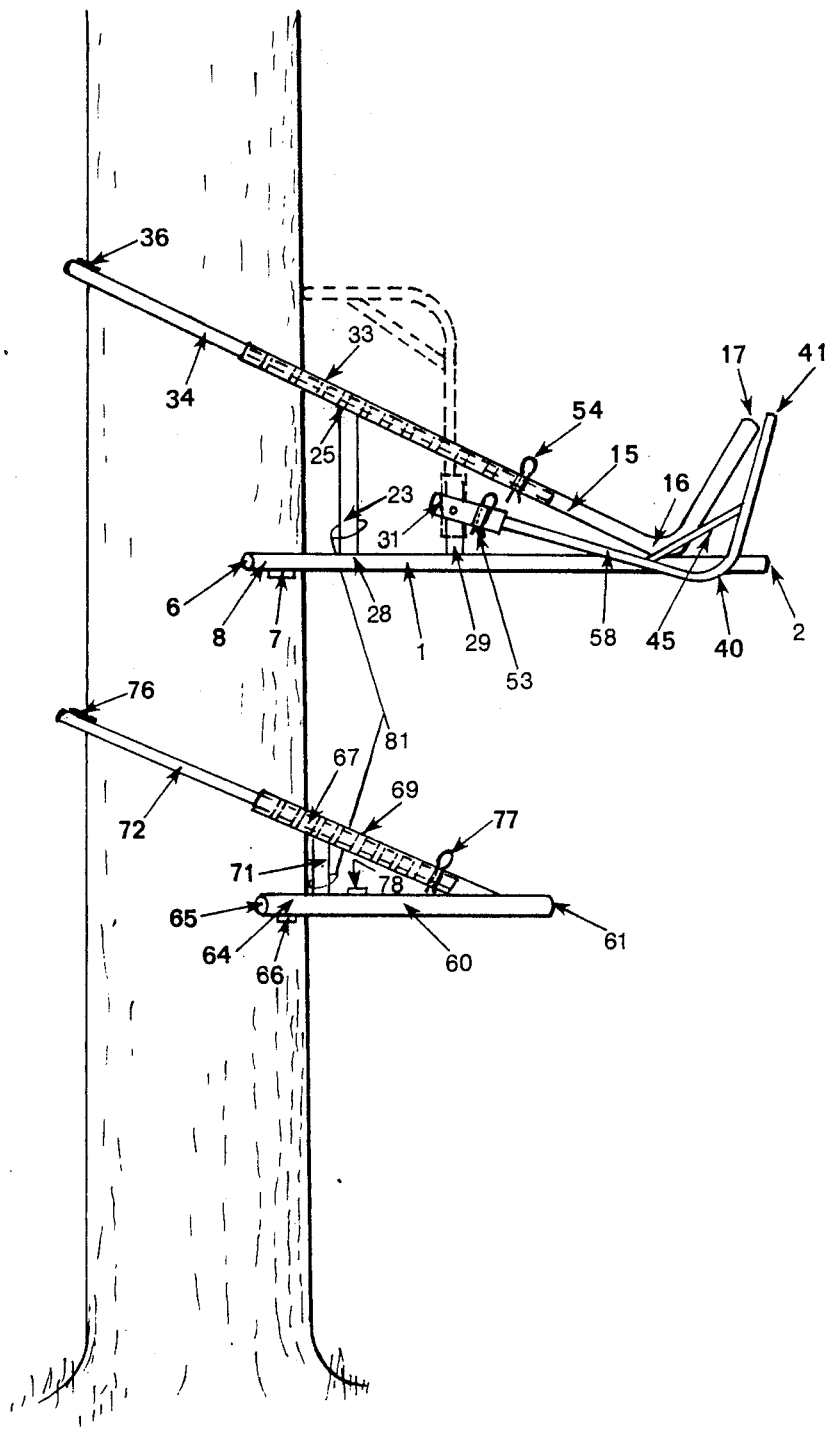
FIG. 2 is a side view of the preferred embodiment illustrated in FIG. 1, with seat member stored behind back rest member.

Referring to FIGS. 1 and 2 the upper stand supports user's body in a sitting or standing position and consists of a main frame support member 1 formed from one piece of tubular steel by making 90° bends at 2, 4, 5 and 8. Tubing at bends 5 and 8 are cut at the approximate center of their bend at an angle to weld a length of tubing member 6 called a gripper support brace which has a 60° bend at its center and member 6 welded to member 1 at 5 and 8. Frame 1 has a transverse base member 10 welded at 11 and 12 and brace member 9 is centered and welded at 13 and 3 for additional support. Steel tree engagement gripper blade 7 is welded to member 6 and spaced an equal distance from the center of the 60° bend. Welded to main frame support member 1 is platform 14 preferably 14 gauge expanded metal or other appropriate ate material with enough strength to support user's body weight. Rigid rail brace member 15 is bent from one continuous length of tubular steel and has 90° bends at 17 and 18 to form a rectangular shaped member and then bent at approximately a 80° angle about 12 inches from bends 17 and 18 to form bend 16 and 19 with rigid rail brace member 20 being equal in length to rigid rail member 15 and with a matching angle. Rigid rail members 15, 20 are welded to main frame support member 1 at 21, 22 and welded to two rear upright braces or gussets 23; 24 at 25 and 26 with other end of gussets welded at 27, 28 to frame member 1. The distance formed between bends 17, 18 is termed a back rest, foot rest, and a safety rail or guard and can be padded for user comfort by a variety of materials and methods. An optional horizontal transverse brace (not illustrated) can be added between the back rest upright vertical sections as a means to secure an optional back rest padded member and to allow the user's lower legs above the ankles to make contact with said back rest support member to alert user when standing upright on stand platform member that the forward portion of platform has been reached. This horizontal transverse brace member acts as a dual forward safety rail or guard member.

An additional optional brace member (not illustrated) can be added between each rigid rail member near the lower hole or aperture drilled in each rigid rail member near the pivotal tubular holders and welded to the upright portion above the 80° bend where the back rest, foot rest, and safety rail or guard member starts which offers increased side restriction as a safety means and further strengthens the 80° bend area that is welded to the forward main frame support member.

The length of rear upright braces or gussets 23, 24 are of a length to give at least a 30° inclination for the rigid rails 15 and 20 which gives adequate separation between tree engagement grippers 7 and 36 for stability. Welded between main frame support member 1 and rigid rail members 15, 20 are two (2) shorter upright braces or gussets 29, 30 which support the pivotal tubular holder 31, 32 which are bolted to the center of each gusset 29, 30 by using a ¼ bolt and locking nut. These additional braces also offer the rigid rails 15, 20 increased side to side stabilization. Rigid rails 15, 20 have 10 equal spaced holes 33 drilled through their center for adjusting the hexagon shaped tubular steel tree engagement leg member 34, 35 that will slide inside rigid rails 15, 20 and each leg member 34, 35 has a hold drilled near the end of leg 34 35 to allow a clip pin 54 or similar device to be passed through rigid rails 15, 20 at holes 33 of each leg 34, 35 for alignment of both members 34 and 15 and 35 and 20. Optional alignment aperature(s) (not illustrated) on half hexagon tree engagement member stand and foot climber with two (2) aperatures on each leg member 34, 35 and member legs 72 near the terminal end of each leg member being spaced on half or one and one half times the spacing distance of rigid rail aperatures 33 and 69 which allows the stand or foot climber to be more precisely leveled to a horizontal position on varying diameter trees within the capacity of the stand or foot climber member. The half hexagon shaped tubular steel tree engagement member is formed from one length of tubular steel of a size that will fit inside rigid rail members 15, 20 and has a 60° bend at center 38 and equal 60° bends at 7, 39 an equal distance from center bend 38 of a width that will allow legs 34, 35 to fit inside rigid rail members 15 and 20. Optional horizontal brackets (not illustrated) of 16 gauge flat sheet steel at 1½ width x 5"length with radius on one side of bracket to match the radius of 60° bend at 37, 39 of half hexagon tubular steel tree engagement gripper and welded at each bend 37, 39 may be used to strengthen each 60° bend. Two 12 gauge steel tree engagement gripper blades 36 are formed from flat sheet steel and have a 45° bend about ¼ from one of the longer sides and a bevel cut on opposite edge away from tubular steel half hexagon shape that makes contact with tree. Gripper blades 36 are welded to hexagon shaped tee engagement member an equal distance from center bend 38 with bevel side downward toward lower gripper blades 7 for gripping action similar to a wood chisel. Alignment holes 33 in rigid rail member 15, 20 allow tree engagement legs 34, 35 to adjust inside rigid rails 15, 20 for varying tree diameters.

Detachable seat frame 55 is formed from one piece of tubular steel bent into a rectangular shape with 90° bends at 41 42 allowing equal leg lengths. Tubing is further bent at 40, 43 with matching 90° bends at a right angle from bends 41, 42 to shape as shown. Tubular steel seat leg braces 44, 45 are welded at a 45° angle on opposite and equal placement from bends 42, 40 to seat legs 57, 58. A transverse brace member 46 is welded to seat frame 55 at 48, 49. An additional seat brace member 47 is welded at 50, 51 for further support. Seat frame is further covered with 16 gauge wire mesh platform 56 and welded at seat frame to allow user to sit upon. Two holes are drilled in seat frame legs 57, 58 at 52, 53 to allow eat to be attached and removed from pivotal brackets 31, 32 by using a clip pin or similar device. By the use of pivotal member 31, 32 seat can be removed from the rear of the back rest members 17, 18 and platform 14 while sitting on platform 14 by pulling clip pins, and seat can be reattached into members 31, 32 by raising them upright and inserting seat legs 57, 58 into pivotal brackets 31, 32 and aligning holes 52, 53 with matching holes in brackets 31, 32 and inserting clip pins and resting seat frame 55 against tree. Alternate attachment means (not illustrated) inserted inside each seat leg member 57, 58 at aperatures 52, 53 is a spring action button made from one piece of spring steel allowing the button to protrude through each aperature 52, 53 and the button will telescopically align with pivotal member 31, 32, thereby making it more convenient to detach and re-insert each seat leg member 57, 58 into pivotal member 31, 32. A cord, wire, rope or cable 81 is attached from rear gusset member 23, or 24 on upper stand and attached to foot climber gusset member 71 or 70 to keep foot climber within reach of user in case the foot climber is accidentally disengaged while user's feet are out of strap 78 on foot climber platform 79 and further provides a means of adjusting the user maximum leg stroke length taken when using both devices.

Figure 3:
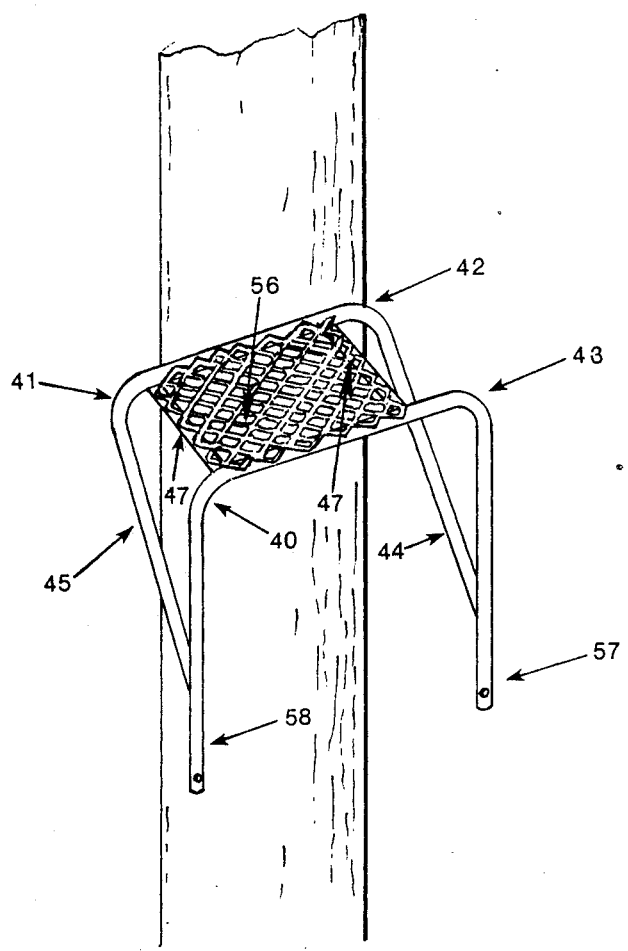
FIG. 3 is a perspective view of a preferred embodiment of the detachable seat member.

Referring to FIG. 3, detachable seat member is formed by bending tubular steel at 40, 43 with 90° bends forming legs 57, 58. Tubular steel is bent at 41, 42 with 90° bends forming 44, 45 bracing means. Two (2) transverse bracing means 47 are attached (welded) between bends 40, 41 and 43, 44 leaving a rectangular area covered by seat platform member 56, bracing means 44, 45 is welded to legs 57, 58. A single hole is drilled through each seat leg member 57, 58 for attachment to pivotal holders 31, 32 at 52, 53. The detachable seat of FIG. 3 is preferred.

Attached to rigid rail member 20, parallel to the outer most edge and positioned approximately half the distance between gusset member 32 and weld reference 22 is seat stop member 59 constructed of a ⅜ square steel bar of an appropriate length which prevents the transverse brace member 46 from contacting the rigid rail member at bends 16 and 19 by obstructing the vertical to horizontal movement of seat leg member 57, whereas user cannot use the detachable seat as a back rest by allowing the detachable seat to be able to pivot from a vertical to a horizontal position which would place user safety in jeopardy since user would have to step over the pivoting seat in order to place seat member against the base of tree T. Detachable seat member 46 will contact platform member 14 near main frame member reference 3 when not in use. p The lower member called a foot climber consists of a main frame support member 60 formed from one length of tubular steel with 90° bends at 61, 62, 63 and 64. Frame support member 60 is cut at bends 63, 64 of appropriate angle to weld tree engagement gripper support member 65 which is formed from tubular steel with a 60° bend at its center and member 65 is welded to main frame support member 60 at 63, 64. Gripper support member 65 has two (2) steel grippers blade 66 identical to stands gripper blades 7 and 36 and welded to gripper support member 65 at an equal distance from center bend to grip the tree Welded to main frame support member 60 near bends 61, 62 is tubular steel members 67 68 termed rigid rails which have 8 holes 69 drilled through each rail equal distances apart which provided for adjustment of half hexagon shaped tubular steel tree engagement legs 72 by inserting legs 72 inside rigid rails 67, 68 and aligning the hole provided in each leg 72 and holes 69 on both rigid rails 67, 68 and inserting clip pin 77 through both said members. Two (2) upright braces or gussets 70, 71 are welded between main frame support member 60 and rigid rails 67, 68. The half hexagon shaped tubular steel tree engagement member is formed from one length of tubular steel with a 60° bend at 74, and two additional 60° bends at 73 and 75 with two (2) equal length legs 72 that will slide inside the rigid rail members 67, 68. Welded to the half hexagon shaped tubular steel tree engagement member are two steel gripper blades 76 which are identical to gripper blades 66, 7 and 36 already described. A rectangular shaped rubber strap or bungee tie down cord 78 is attached to wire mesh platform 79 by using wire compression rings, wire or similar attachment to allow the user to place feet underneath said strap to keep user's feet attached to foot climber platform 79. Wire mesh platform 79 is welded to foot climber main frame support member 60 and is of a thickness to adequately support user's feet and body weight. A transverse brace member 80 of tubular steel is welded between main frame support member 60 and tree engagement gripper member 65 and is centered between said frame support memeber 60 and member 65 to support platform member 79.

The preferred method of operating the upper climbing member or stand and the lower climbing member foot climber will be described and understood by reference to FIG. 1, FIG. 2 and FIG. 3 although alternate methods are possible to suit individual user preferences. Position both stand and foot climber near the base of tree or columnar structure and remove the half hexagon shaped tubular steel tree engagement legs 34, 35 from stand rigid rails 15, 20 of stand by removing clip pins 54 from alignment holes 33. Place stand member 6 gripper blades 7 against tree T with stand resting on the ground. Place half hexagon shaped tubular steel tree engagement member legs 34, 35 around the opposite side of tree T and insert member legs 34, 35 into rigid rails 15, 20 until contact is made from stand gripper blades 7 and gripper blade members 36. At this time while holding one side of leg 34, or 35 raise stand upward a couple of feet off the ground and tilt stand upward to allow for any tree diameter taper. Align legs 34, 35 to nearest alignment hole(s) 33 in rigid rails 15, 20 and insert clip pin 54 through both members 34, 15 and 35, 20. The stand is slid further upward and to one side out of the way while foot climber is attached to said tree. The half hexagon shaped tubular steel tree engagement gripper 72 is removed from rigid rails 67, 68 of foot climber by removing the two clip pins 77 and pull gripper legs 72 out of the rigid rails 67, 69. Place half hexagon shaped tubular steel tree engagement member legs 72 around tree and insert legs 72 into rigid rails 67, 68 and push the legs 72 into rails 67, 68 until lower grippers 66 and upper grippers 76 to make contact with both sides of the tree T. Tilt the foot climber frame upward at an angle to allow for any tree diameter taper and align gripper legs 72 with holes 69 in rails 67, 68 with the closest alignment holes 69 and insert clip pin 77 though both rigid rails 67, 68 and gripper legs 72. With the stand and foot climber attached to tree T user is ready to get into and on stand and foot climber. Reposition stand and foot climber very near to the ground and foot climber very close to the stand. While holding to stands rigid rails 15 or 20 step on stand's wire mesh platform member 14 and then place legs through stand opening defined by member 10 and members 6 and step into lower foot climber platform 79. If stand and foot climber are positioned close enough to ground level, user can step directly through the stand opening as defined by stand members 10 and 6 onto the foot climber platform member 79. User can then sit on stand platform member 14 and insert feet under the foot climber rectangular rubber tie down strap member 78 by stretching the strap upward with one hand while sliding feet under said strap. Once user's feet are under foot strap member 78 on platform 79, user is ready to climb tree. User stands upright and raises or slides stand vertically by lifting stand upward with both hands by maintaining a grip or hand position on stand rigid rail members 15 and 20 between the rear gussets 23, 24 and center gussets 29, 30. To raise the stand upward, user should tilt stand platform member 14 upward to allow lower grippers 7 to disengage from tree and the upper grippers 36 on half hexagon shaped tubular steel member. The stand is raised or slid upward until the platform member 14 and stand frame member 10 are resting under user's buttocks. User tilts stand downward until grippers 7 and 36 make firm contact with tree. User then sits on stand platform member 14 and grippers 7 and 36 will dig into tree making firm secure contact. User then raises the foot climber that is attached to user's feet and legs by tilting the foot climber platform member 79 upward by raising the heels and lowering user's toes downward. This will cause the foot climber grippers 66 and 76 to disengage from the tree T. User can now raise legs upward raising or sliding the foot climber vertical along said tree until foot climber is positioned very near the base of stand. The majority of user's weight should be placed on the heels of the user's feet which causes foot climber blades 66 and 76 to dig into said tree making firm contact. User now repeats sliding stand vertically until stand's platform member 14 is again resting against user's buttocks. Once stand grippers 7 and 36 have made firm engagement with said tree, user then sits on platform 14, the foot climber is again raised as forementioned and once the user is at the desired elevation foot climber is then raised to a comfortable distance below the stand. User can now continue to sit on stand platform member 14 with back resting against the back rest area between member 17, 18 of the one piece rigid rail assembly 15, 20 and one further has the option of removing the seat 55 assembly by pulling the clip pins from the pivotable tubular 31, 32 that contain the seat legs 57, 58 and pull the said legs of said seat forward toward user enough to allow legs 57, 58 to clear pivotal member 31, 32 which causes the seat member 46 to clear the stand platform member 14. User can now let go of either leg 57 or 58 with one hand keeping one leg in the hand preferred and bringing the set to either side of the stand and in front of user. An optional safety cord (stretch) may be attached to either brace 44 or 45 on one side only, and the other end of stretch cord to the lower end of gusset member 29 or 30 to prevent user from accidentally dropping the said seat out of user's reach. Once said seat is in front of user, the pivotal members 31, 32 are raised to the vertical position making sure the seat is positioned to where area of seat at 41, 42 will rest against said tree. User now inserts seat legs 57, 58 into pivotal members 31, 32 and inserts clip pins through the alignment holes 52, 53 of said seat legs 57, 58 with matching holes in pivotal members 31, 32. Seat can now be used as a forward rifle, camera or forearm rest allowing the user an excellent stable resting platform. At this time, user can pull up whatever type of equipment intended to be used.

The user now has the option to use the seat platform member 56 to sit upon and use stand platform member 14 to rest feet on. While user is sitting on stand platform member 14, user can use the back rest 17, 18 as an additional support by holding onto the area between 17, 18 with either hand while turning body at an angle from said back rest. User then rests hand or forearm not being used to hold onto the back rest and raise body upright off stand platform member 14 bringing one foot/leg from the foot climber platform member 79 and through the stand openings defined by members 10 and 6 and placing said foot on stands platform member 14 and continue to pivot the body placing buttocks on seat platform member 56 and releasing the hand grip on back rest area between members 17, 18. User then brings the other foot/leg from foot climber onto platform 14. User can now use the back rest area between member 17, 18 as a foot rest for additional support and comfort. User may also wish to use the said foot rest to brace foot/leg on, and use the elbow and forearm resting against same leg resting on foot rest member 17, 18. User's elbow and arm will rest near the knee of said leg to form a stable support user wishes an extra degree of steadiness to support a fire when arm to make a long shot. User wishing to stand on platform member 14 may do so by leaning body slightly forward and standing upright. It is obvious that when using long equipment such as that used in the sport of archery, one has to have extra room forward from said tree without any undue restriction. This stand fulfills that need by not placing obstructions in front of user at excessive height off stand platform 14, and to the side of user in such a manner that will restrict the user or his equipment, yet not depart from the area of safety. The area defined between 17, 18 of stand now serves an additional very useful, unique and novel purpose as a forward safety rail or guard which defines the forward limit of stand platform member 14 and also offers some side restriction. User may wish to use the forward safety rail or guard as a means to brace the lower leg against for additional support when standing upright and using archery equipment. When shooting directly in front of the stand, archery equipment requires increased forward room on platform member 14.

When user desires to descend a tree, equipment may be lowered to the ground using an optional rope or cord and positioned away from the base of the tree. User will sit on stand platform member 14 and insert feet through the opening as defined by stand member 10 and 6 and place feet under the rectangular rubber tie down strap member 78 on foot climber platform member 79. If the seat is in the forward position against tree, remove the two clip pins from pivotal brackets 31, 32 and pull seat legs 57, 58 from said brackets. Rotate the pivotal brackets to less than a horizontal position facing user and while holding one seat leg only, either leg 57 or 58, position seat to one side of stand on users right or left side and turn seat down and to the rear of stand back rest member 17, 18 and with opposite hand, grip the other end of seat leg 57 or 58. Align seat legs 57, 58 with pivotal brackets 31, 32 and insert legs into said brackets and replace clip pins through holes 52, 53 of seat legs 57, 58 and matching holes in pivotal brackets 31, 32. User is now ready to descend said tree by raising the heels of the feet and lowering the toes of the feet at the same time. This action causes the foot climber grippers 66 and 76 to disengage from said tree. User now lowers the foot climber to leg length while holding to stand's rigid rails 15 and 20 and then places full weight on the heels of the feet causing grippers 66 and 76 to grip said tree. User then disengages the stands grippers 7 and 36 by tilting stand platform member 14 slightly upward by using the hands positioned on rigid rails 15, 20 near the center gussets 29, 30. Once grippers 7 and 36 have disengaged from said tree, stand is allowed to slide downward resting very close to the lower foot climber assembly. The foot climber is now disengaged, and the process is repeated until the foot climber is resting very near the ground. User can then remove feet from the foot climber straps 78 on platform member 79. User now stands upright and steps off the foot climber onto the ground by holding onto the stands rigid rails 15, 20, if desired for extra balance and support. Stand is removed for said tree by removing the two clip pins 54 from the rigid rail members 15, 20 and pulling stand away from said tree causing the half hexagon shaped tubular steel gripper legs 34, 35 to clear the rigid rails 15, 20. Gripper is then removed from said tree and placed back into the rigid rail members 15, 20. The two clip pins 54 are then replaced back through rigid rails 15, 20 and gripper legs 34, 35. Foot climber is removed from said tree by removing the two clip pins 77 from rigid rails 67, 68 and pulls foot climber away from said tree causing loop leg 72 to free the ends of rigid rail members 67, 68. The half hexagon shaped tubular steel gripper legs 72 are then placed back into the rigid rail member 67, 68 and clip pins inserted through the desired alignment holes 69. Foot climber is then placed with the stand in whatever position is desired to transport both devices.

Although the invention has been described with respect to preferred embodiments, it is not to be so limited since various alternatiions, changes, deviations, modifications and departures may be made by those skilled in the art to the embodiments shown, and are within the spirit and intended scope of the present invention.

I claim:

1. An apparatus for climbing a tree or like vertical columnar member comprising an upper climbing member including a main frame having a tree engagement gripper support attached to the terminal ends of the main frame, lower gripper means attached to said gripper support and positioned to provide gripping pressure against a tree, a shaped rail attached to said main frame opposite the terminal ends thereof, and comprising an elevated safety-bar portion in the form of a convoluted loop with two open ends, a tree engagement portion in telescopic sliding adjustment engagement with the open ends of the shaped rail for selectively affixing the shaped rail to a tree, upper gripper means attached to the tree engagement portion and positioned to provide gripping pressure against the tree, a plurality of vertical rear bracing means positioned near the terminal ends of the main frame and joining the main frame to the shaped rail, a main frame platform covering the area between the center and the non-terminal ends portion of the main frame, a plurality of opposed vertical center bracing means joining said main frame and shaped rail a pair of pivotable tubular holders mounted on opposed vertical center bracing means, a detachable seat telescopically inserted into the tubular holders and a foot climber member.

2. The apparatus of claim 1 wherein said upper and lower gripper means each comprises a pair of gripper blades having not greater than about 45 degree angle edges for contacting said tree.

3. The apparatus of claim 1 wherein said tree engagement portion comprises three identical bends forming a half-hexagon shape.

4. The apparatus of claim 1 wherein said foot climber member includes a resilient foot engagement means attached to the foot climber platform and adapted for use by a climbers feet.

5. The apparatus of claim 1 wherein said elevated safety-bar portion is positioned at a height above said main frame opposite the terminal ends thereof of from about 10 to 14 inches (25.4 to 35.5 centimeters), preferably 11 to 12 inches ( 27.9 to 30.5 centimeters).

6. The apparatus of claim 1 wherein said elevated safety-bar is in parallel alignment with the edge of said main frame platform.

7. The apparatus of claim 1 wherein a pair of opposed vertical rear braces are employed.

8. The apparatus of claim 1 wherein the detachable seat is shaped to abut the elevated safety-bar portion when pivoted away from the tree.

9. The apparatus of claim 8 wherein the detachable seat is shaped to abut the elevated safety-bar portion in an essentially vertical positron when pivoted away from the tree.

10. An apparatus for climbing a tree or like vertical columnar member comprising an upper climbing member including a main frame with two terminal ends, said main frame having a tree engagement gripper support attached to the terminal ends and shaped to form a bend having an angle of about 120 degree for positioning the main frame against a tree, a pair of gripper blades having not greater than about 45 degree angle edges attached to said gripper support and positioned to provide gripping pressure against a tree, a shaped rail comprising an elevated safety bar portion in the form of a convoluted loop with two o en ends positioned at a height above and opposite the terminal ends of said main frame of from about 10 to 14 inches (25.4 to 35.5 centimeters) and attached to said main frame opposite the terminal ends thereof, a tree engagement portion comprising three identical bends forming a half-hexagon shape and in telescopic siding adjustment engagement with the open ends of said shaped rail for selectively affixing the shaped rail to a tree, a pair of gripper blades having not greater than about 45 degree angle edges attached to the tree engagement portion and positioned to provide gripping pressure against a tree, a pair of opposed vertical real braces positioned near the terminal ends of the main frame and the two open ends of the shaped rail and joining the main frame to the shaped rail, a main frame platform attached to and covering the area between the center and the non-terminal ends portion of the main frame, a pair of opposed vertical center braces joining said main frame and shaped rail, a pair of pivotable tubular holders centrally mounted on the external side of the center braces, a detachable seat for telescopic insertion into the tubular holders and a foot climber member.

* * * * *